(12) United States Patent
Roberts

(10) Patent No.: US 6,428,720 B1
(45) Date of Patent: Aug. 6, 2002

(54) REFRIGERANT COMPOSITIONS

(75) Inventor: Neil A. Roberts, Bristol (GB)

(73) Assignee: Rhodia Limited, Watford (GB)

( * ) Notice: Subject to any disclaimer, the term of this patent is extended or adjusted under 35 U.S.C. 154(b) by 0 days.

(21) Appl. No.: 09/351,335

(22) Filed: Jul. 12, 1999

Related U.S. Application Data

(63) Continuation-in-part of application No. PCT/GB98/02079, filed on Jul. 15, 1998.

(30) Foreign Application Priority Data

Jul. 15, 1997 (GB) .............................................. 9714880

(51) Int. Cl.$^7$ ................................................ C09K 5/04
(52) U.S. Cl. .............................. 252/67; 62/114; 252/68
(58) Field of Search ............................... 252/68; 62/114

(56) References Cited

FOREIGN PATENT DOCUMENTS

| EP | 0 565 265 | 3/1993 |
|---|---|---|
| EP | 0 779 352 | 6/1997 |
| GB | 2 247 462 | 4/1992 |
| GB | 2 291 884 | 7/1996 |
| JP | 4-18484 * | 1/1992 |
| WO | 95 08602 | 3/1995 |
| WO | 96 15205 | 5/1996 |

OTHER PUBLICATIONS

Determination Of The Performance, Leak Scenario, Flammability And Oil Return Characteristics Of A Novel R22 Replacement, N.A. Roberts, Jul. 13, 1998.

* cited by examiner

Primary Examiner—Margaret Einsmann
(74) Attorney, Agent, or Firm—Burns, Doane, Swecker & Mathis, L.L.P.

(57) ABSTRACT

Refrigerant compositions are disclosed which comprise:
(a) pentafluoroethane, octafluoropropane, trifluoromethoxydifluoromethane or hexafluorocyclopropane, or a mixture of two or more thereof, in an amount of at least about 35% based on the weight of the composition,
(b) 1,1,1,2- or 1,1,2,2-tetrafluoroethane, 1,1-difluoroethane, trifluoromethoxypentafluoroethane, 1,1,1,2,3,3-heptafluoropropane or a mixture of two or more thereof, in an amount of at least about 30% by weight based on the weight of the composition and
(c) n-butane, in an amount from about 2.3 to about 4% by weight based on the weight of the composition.

9 Claims, 3 Drawing Sheets

REFRIGERANT COMPOSITIONS

Figure 1:
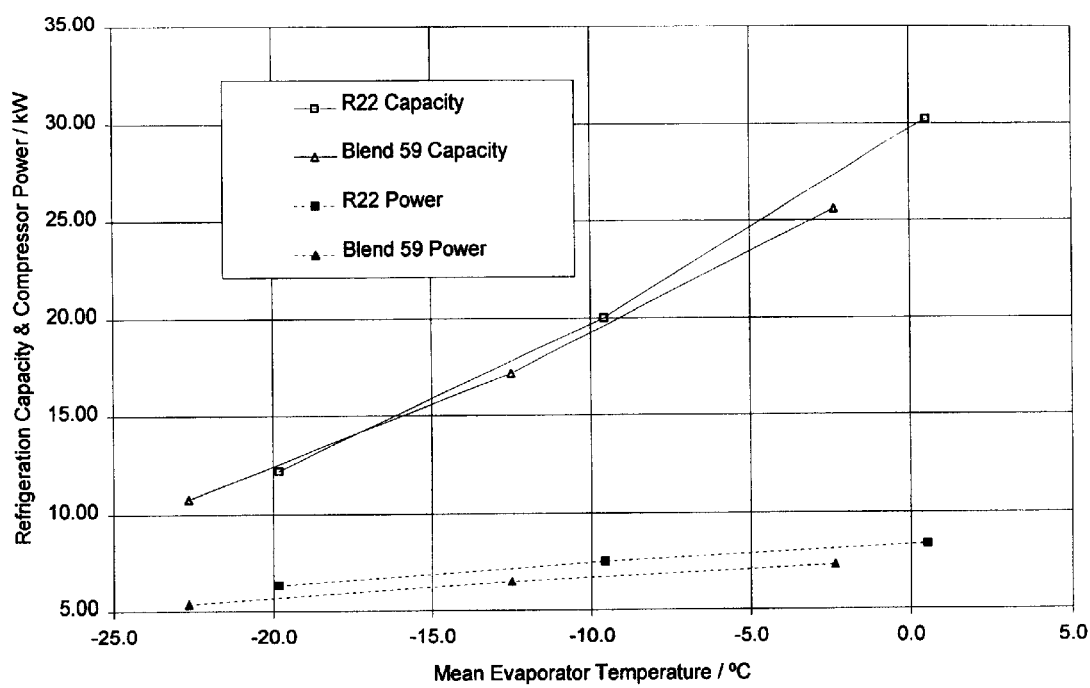

This application is a continuation-in-part of PCT/GB98/02079, filed Jul. 15, 1998, which designates the United States.

The present invention relates to refrigerant compositions, particularly for use as replacements in refrigeration equipment currently employing, or designed to employ, the refrigerants R12 and R22.

Refrigerant R12 ($CCl_2F_2$) has been a commonly used refrigerant especially in domestic refrigerators. However, R12 contains chlorine atoms and has been implicated in environmental damage to the ozone layer. As a result efforts have been made to replace R12 with a refrigerant formulation which does not involve the use of refrigerants such as R12 which contain chlorine atoms. Similar comments apply to R22 which is used principally for airconditioning systems.

Among alternatives, particular attention has been directed at R134a ($C_2H_2F_4$; 1,1,1,2-tetrafluoroethane) along with pentafluoroethane (R125) (b.pt. −48.6° C.). Commercial formulations of these two refrigerants involve the use of a hydrocarbon, namely propane, propylene or isobutane. While these refrigerant formulations are generally effective as replacements for R12 and R22, nevertheless it has been found that their use is not entirely satisfactory.

Difficulty has arisen with the flammability of the fractionated composition, that is to say the vapour above the liquid composition possesses flammability problems. As a result these commercial formulations can produce flammable compositions under some leak scenario conditions. The flammability of these refrigerant compositions resides in their hydrocarbon content. One of the purposes of incorporating the hydrocarbon is so that the formulation is compatible with the lubricants ordinarily used in R12 and R22 refrigeration equipment. The specific hydrocarbons have been selected because they possess the correct boiling point in relation to that of the fluorocarbon.

It has now been found, surprisingly, according to the present invention, that if a hydrocarbon with at least 4 carbon atoms other than methyl propane (isobutane) is used instead of those previously advocated the flammability of the fractionated composition is greatly reduced. This result is very surprising as n-butane, for example, has a significantly higher boiling point (−0.5° C.) than, say, isobutane (−11.7° C.) and is accordingly less volatile. Indeed, the US NIST (National Institute of Standards & Technology) computer programs REFPREP and REFLEAK have predicted that a particularly preferred such n-butane-containing formulation would be flammable when it has been found not to be. Further, although there can be a considerable boiling point range between the lowest boiling point component and the hydrocarbon of the composition the temperature glide of the blend is relatively small. In a particular embodiment, although the boiling point range is 36.2° C., the temperature glide is only 3.9K at the boiling point of −34.6° C. at one atmosphere pressure. It is further surprising that such a formulation has a reduced flammability because n-butane, for example, has a larger range of flammability limits as compared with isobutane. Thus n-butane has a flammability range from 1.5 to 10.1% v/v whereas for isobutane it is only 1.7 to 9.7% v/v.

According to the present invention there is provided a refrigerant composition which comprises:
(a) R125, R218 (octafluoropropane; b.pt. −36.7° C.), trifluoromethoxy difluoromethane (b.pt. −34.6° C.) or hexafluoro-cyclopropane (b.pt. −31.5° C.), or a mixture of two or more thereof, in an amount from 5 to 60% by weight based on the weight of the composition
(b) R125, R134a, R134 (1,1,2,2-tetrafluoroethane), 1,1-difluoroethane (R152a; b.pt. −24.7° C. ), trifluoromethoxypentafluoroethane (b.pt. −23.3° C. ), 1,1,2,3,3,3-heptafluoropropane (R227ea; b.pt. −18.3° C.) or 1,1,1,2,2,3,3-heptafluoropropane (R227ca; b.pt. −16.3° C.), or a mixture of two or more thereof, in an amount from 30 to 94% by weight based on the weight of the composition and
(c) an unsubstituted hydrocarbon of the formula $C_nH_m$ in which n is at least 4 and m is at least 2n−2, other than methyl propane, in an amount from 1 to 10% by weight based on the weight of the composition.

The present invention also provides a process for producing refrigeration which comprises condensing a composition of the present invention and thereafter evaporating the composition in the vicinity of a body to, be cooled. The invention also provides a refrigeration apparatus containing, as refrigerant, a composition of the present invention.

Component (c) will be present in an amount from 1 to 10%, especially 1 to 8%, preferably 2 to 6% and more preferably 2 to 5%, and in particular 3 to 4%, most preferably about 3.5%, by weight of the composition.

It will be appreciated that component (a) and component (b) can both be R125. In this situation the composition can, therefore, be binary and the amount of R125 will be from 90 to 99% by weight. In all other situations, the composition will be at least ternary.

Among the preferred compositions of the present invention are those which contain one or more of R125, R134a and R218. Thus component (a) preferably comprises R125 and/or R218 while component (b) preferably comprises R125 and/or R134a.

The presence of R218 (b.pt −36.7° C.) is particularly useful where the only other fluorocarbon is R134a. In such circumstances R218 is particularly present in an amount from 5 to 20% by weight, especially 5 to 15%, and more preferably 7 to 12% by weight of the composition.

Component (a) is present in an amount from 5 to 60% by weight, generally 5 to 50% by weight. If R125 does not form part of component (a) then the amount will typically be from 5 to 20%, especially 5 to 15% and preferably 7 to 12%, by weight. It will be appreciated that if the composition contains R125, the concentration of R125 can be split between components (a) and (b).

The concentration of component (b) is from 30 to 94% by weight, generally 50 to 90% and especially 75 to 90%, by weight.

Typically hydrocarbons which can be employed as component (c), and which may be saturated or unsaturated, possess 4 or 5 carbon atoms and include methylenecyclopropane, 1-butene, cis and trans-2-butene, butane, cyclobutane, cyclopentene, cyclopentane, 2-methyl-1-butene, 2-methyl-2-butene, 3-methyl-1-butene, 1-pentene, cis and trans-2-pentene, 2-methylbutane, pentane and mixtures of two or more thereof. The use of n-butane (R600) is particularly preferred.

Specific formulations which have been found to be effective are as follows:

|  | % by weight |  | % by weight (a) | % by weight (b) |
|---|---|---|---|---|
| R218 | 9 | R125 | 46 | 46.5 |
| R134a | 88 |  | 50 | 50 |
| n-butane | 3 |  | 4 | 3.5 |

It has also been found that certain compositions with specific amounts of n-butane as component (c) have particularly advantageous properties. According to the present invention, there is also provided a refrigerant composition which comprises (generally in the liquid phase):

(a) pentafluoroethane, octafluoropropane, trifluoromethoxydifluoromethane or hexafluorocyclopropane, or a mixture of two or more thereof, in an amount of at least about 35% based on the weight of the composition, (b) 1,1,1,2- or 1,1,2,2-tetrafluoroethane, 1,1-difluoroethane, trifluoromethoxypentafluoroethane, 1,1,1,2,3,3-heptafluoropropane or a mixture of two or more thereof, in an amount of at least about 30% by weight based on the weight of the composition and (c) n-butane, in an amount from about 2.3 to about 4% by weight based on the weight of the composition.

Component (a) is present in an amount of at least 35% by weight based on the weight of the composition. In practice, the concentration will generally be at least 40% by weight although a general range is 35 to 65% by weight. A preferred range is 40 to 55% by weight, especially 45 to 52% by weight. Preferably, component (a) is R125.

Component (b) is present in the composition in an amount of at least 30% by weight based on the weight of the composition. Typically, the component is present in an amount from 35% to 60% by weight, preferably 45 to 60% and especially 47.5 to 55% by weight. Component (b) is preferably R134a.

Component (c) is n-butane. It has been found that the best results are obtained using about 3.5% by weight based on the weight of the composition. Generally amounts greater than this can give rise to flammability problems. Generally the performance of the composition deteriorates as the concentration of butane is decreased down to 2.3% by weight. Similarly, for a given butane content, the performance characteristics of the composition deteriorate as the concentration of R125 is increased.

The presence of at least one further component in the compositions is not excluded. Thus although, typically, the composition will comprise the three essential components, a fourth component, at least, can also be present. Typical further components include hydrocarbons such as propane and isobutane as well as other fluorocarbons. In general, the maximum concentration of these other ingredients does not exceed 30% by weight, typically not exceeding 20%, preferably not exceeding 10% and especially not exceeding 5% by weight, based on the sum of the weights of components (a), (b) and (c). Further it is desirable that the maximum hydrocarbon content in the composition does not exceed 4% by weight. Desirably the n-butane represents at least 70%, preferably at least 80% and more preferably at 90%, by weight of the total weight of hydrocarbons in the composition. It will be appreciated that it is preferable to avoid perhalocarbons so as to minimise any greenhouse effect.

It has been found that the compositions of the present invention are highly compatible with the mineral oil lubricants which have been conventionally used with CFC refrigerants. Accordingly the compositions of the present invention can be used with mineral oil and alkyl benzene lubricants including naphthenic oils, paraffin oils and silicone oils, and there is no need to employ fully synthetic lubricants such as polyol esters (POE), polyalkyleneglycols (PAG) and polyoxypropylene glycols which are needed for many of the newer refrigerant compositions. Further details of suitable lubricants which can be employed are disclosed in EP-A-399817.

The following Examples further illustrate the present invention; Examples 2,3 and 5 are included for comparison.

The usual additives can be used including "extreme pressure" and antiwar additives, oxidation and thermal stability improvers, corrosion inhibitors, viscosity index improvers, pour point depressants, detergents, anti-foaming agents and viscosity adjusters. Examples of suitable additives are included in Table D in U.S. Pat. No. 4,755,316.

Worst Case Fractionation Study

The apparatus used for these determinations consisted of a small stainless steel cylinder (343 cm$^3$ internal volume) which was charged with the blend under evaluation in various fill ratios and was then placed in a temperature controlled bath brought to the appropriate temperature and allowed to equilibrate for at least 30 minutes. The temperature in the bath was controlled to within 0.1° C. and was monitored with a platinum resistance thermometer. Once equilibrated a 75 cm$^3$ sample cylinder was attached to the test cylinder using quick connections and the void spaces between the test cylinder and the sample cylinder evacuated with a vacuum pump. The system was left for at least 15 minutes to check for leaks and then vapour from the test cylinder was slowly introduced into the sample cylinder using a metering valve. Once the pressure in the sample cylinder reached 1 atmosphere the introduction was stopped, the two cylinders isolated and then the sample cylinder was removed for analysis by GLC. The GLC was calibrated using three separate analyses of a standard which were made up in such a way as to be quite close to the vapour composition expected for the test mixture. This sampling was repeated and a duplicate sample analysed on the GLC. This was repeated at various temperatures with various fill ratios and the worst case result was the one with the highest hydrocarbon content.

The results obtained are shown below. The flammability tests, determined using the method detailed in ASTM E 681-85, show that the formulations of Examples 1 and 4 are significantly superior to those of Examples 2, 3 and 5, while possessing good refrigeration performance. It will be noted that the vapour of the composition of Example 1 (and 4) was non-flammable. It is clear that similar comments apply to the composition R125—46.5%, R134A—50% and R600—3.5%.

Performance Testing

The performance testing was performed on a blend of composition 46.5% w/w R125,

|  | Liquid Composition % w/w | | | | |
|---|---|---|---|---|---|
|  | R125 | R218 | R134a | R600a | R600 |
| Example 1 | 46 | — | 50 | — | 4 |
| Example 2 | 46 | — | 50 | 4 | — |
| Example 3 | 46.5 | — | 50 | 3.5 | — |
| Example 4 | — | 9 | 88 | — | 3 |
| Example 5 | — | 9 | 88 | 3 | — |

-continued

Refrigeration Performance as an alternative to R22

| Evaporator Temperature/° C. | Refrigeration Effect/kW | | | | Coefficient of Performance | | | |
|---|---|---|---|---|---|---|---|---|
| | R22 | Example 1 | Example 2 | Example 3 | R22 | Example 1 | Example 2 | Example 3 |
| −15 | 0.932 | 0.855 | 0.823 | 0.711 | 1.269 | 1.204 | 1.194 | 0.966 |
| −10 | 1.328 | 1.124 | 1.133 | 1.058 | 1.492 | 1.443 | 1.436 | 1.323 |
| −5 | 1.723 | 1.437 | 1.478 | 1.413 | 1.716 | 1.700 | 1.695 | 1.624 |
| 0 | 2.118 | 1.796 | 1.852 | 1.775 | 1.939 | 1.976 | 1.970 | 1.669 |
| 5 | 2.513 | 2.200 | 2.262 | 2.145 | 2.163 | 2.270 | 2.262 | 2.058 |

Refrigeration Performance as an alternative to R12

| Evaporator Temperature/° C. | Refrigeration Effect/KW | | | Coefficient of Performance | | |
|---|---|---|---|---|---|---|
| | R12 | Example 4 | Example 5 | R12 | Example 4 | Example 5 |
| −15 | 0.585 | 0.706 | 0.738 | 0.942 | 1.002 | 1.036 |
| −10 | 0.786 | 0.877 | 0.889 | 1.227 | 1.312 | 1.314 |
| −5 | 1.018 | 1.119 | 1.128 | 1.513 | 1.623 | 1.591 |
| 0 | 1.281 | 1.434 | 1.453 | 1.799 | 1.933 | 1.869 |
| 5 | 1.575 | 1.820 | 1.865 | 2.085 | 2.244 | 2.146 |

Fractionation and Flammability test results

| Blend | Fractionated Vapour Composition/% w/w | | | | | Lower Flammable Limit % v/v in Air |
|---|---|---|---|---|---|---|
| | R125 | R218 | R134a | R600a | R600 | |
| Example 1 | 60.7 | — | 34.6 | — | 4.7 | Non Flammable |
| Example 2 | 64.4 | — | 29.1 | 6.5 | — | 12 |
| Example 3 | 64.7 | — | 29.8 | 5.5 | — | 15 |
| Example 4 | — | 22.9 | 72.5 | — | 4.6 | Non Flammable |
| Example 5 | — | 21.6 | 72.5 | 6 | — | 9 |

50.0% w/w R134a and 3.5% w/w R600 (referred to as blend 59). The testing was performed at ILK (Institut für Luft und Kältetechnik, Dresden, Germany) on a rig comprising a semihermetic Bitzer compressor (type 4T-12.2) with B5.2 mineral oil, shell and tube condenser and a shell and tube brine fed evaporator fitted with heaters to balance against the refrigerant cooling capacity. Both R22 (chlorodifluoromethane) and blend 59 were tested at the following conditions;

Condensing Temperature=40° C. Evaporating Temperatures −20° C., −10° C. and 0° C.

The refrigeration capacity and compressor power results are shown in FIG. 1. It can clearly be seen that the refrigeration capacity of blend 59 is comparable to that of R22 with a significant decrease in the compressor power requirement. This leads to an increase of coefficient of performance (COP) between 12.5% at −20° C. to 4.5% at 0° C. This large increase in COP has the beneficial effect of dramatically reducing the power consumption over the lifetime of the equipment and therefore the environmental impact, with regards to global warming, is also reduced.

Leak Scenarios and Flammability

In order to comply with ASHRAE Standard 34 it is necessary to demonstrate that a blend is non-flammable not only as formulated but also from a theoretical leak scenario. The leak scenarios are performed at two fill ratios (15% v/v and 90% v/v) and at three temperatures (boiling point +10K, 23° C. and 54.4° C.). The composition from either vapour or liquid phase found to have the highest concentration of the flammable component is then tested for flammable limits. The flammability test method used in this study was ASTM E 681-85 and the flammability tests were performed at 60° C. for the worst case leak and 100° C. for the as formulated composition.

Figure 2:
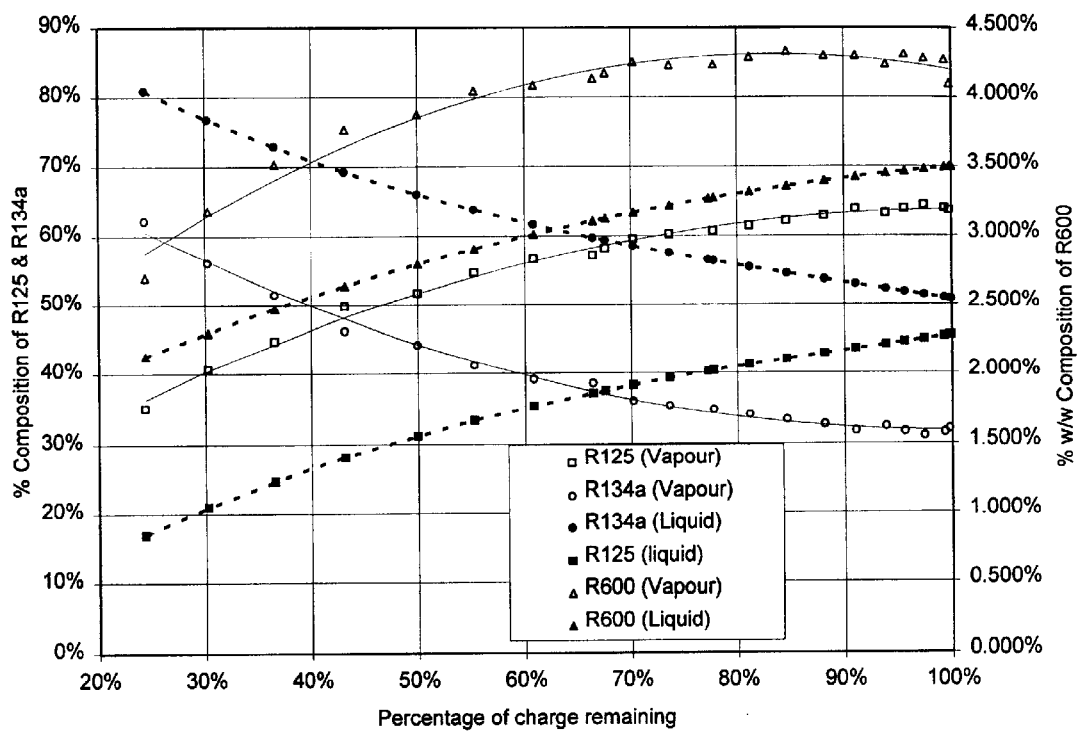

The leak scenario was performed by charging a cylinder with the required amount of the blend, placing the cylinder in a temperature controlled bath and then isothermally removing quantities from the vapour phases. The composition of the vapour phase and liquid phase was then determined (the latter from theoretical calculations) and the process repeated until the pressure in the cylinder was equal to atmospheric pressure. The conditions for the worst case scenario was at −31.8° C. (boiling point +10K) with a 90% fill ratio as shown in FIG. 2. The composition with the highest concentration of the most flammable component was found to occur after 72% had leaked giving a vapour phase of composition 59.9% w/w R125, 35.8% w/w R134a and 4.3% R600. This composition along with the as formulated composition was then tested for flammable limits as detailed above. Except for the vapour phase composition at 100° C. which was not tested, all the compositions/temperatures were found to be non-flammable.

Oil Return Characteristics

Figure 3:
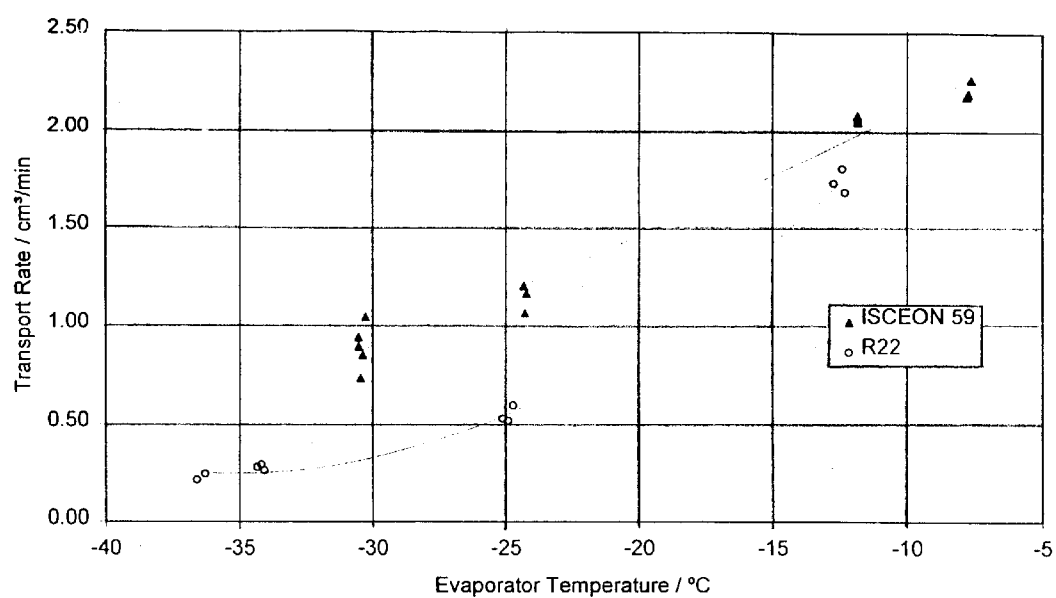

The equipment used consisted of Danfoss SC12BXT2 air cooled condensing unit with the original mineral oil lubricant and a sight glass fitted to the compressor shell to enable the oil level to be checked. An automatic expansion valve was used leading to an evaporator placed in a temperature controlled bath to control the suction gas superheat. The suction line immediately after the evaporator was heavily insulated and a heat exchanger was used to maintain a constant temperature in the suction line up to the point where the oil flow was measured. Also prior to the point of measurement the suction line rose vertically for ~1 meter. The rate of oil flow was determined by closing valve V1 and measuring the time taken for the oil level to rise between two marked points on the transparent perfluoroalkoxy (PFA)

tubing. A further section of the PFA tubing was placed in the suction line after the measurement point to act as a visual check that the oil was not by-passing the collection tube. The tests were performed over the temperature range −36° C. to −8° C. and the results given in FIG. 3 show that blend 59 can transport traditional lubricants at a faster rate than R22, particularly at low temperatures. This good result for the ability to transport traditional oils within a refrigeration system was achieved despite the relatively low solubility of the refrigerant in the oil (~8% w/w at −30° C.). However this relatively low solubility also means that blend 59 should only be used in direct expansion systems. Systems utilising a flooded evaporator design would require the high degree of solubility offered by the fully synthetic oils such as POE.

Assessment of Variables

Experimental Method

The apparatus used incorporated a hermetic reciprocating compressor, forced air cooled condenser, manual expansion valve and an evaporator enclosed in an insulated bath filled with an aqueous glycol mixture. Electrical heater elements were fitted to the bath assembly in order to provide a heat load on the evaporator. Numerous thermocouples were fitted around the system to enable determination of the superheat and subcooling of the refrigerant. Pressure gauges were also fitted to allow the evaporator and condenser temperatures to be determined.

The refrigerant composition was charged to the calorimeter from the liquid phase cylinder access in order to avoid any shift in the composition. The capacity (heat extraction rate) of the refrigerant compositions were determined by measuring the heat input to the bath balanced against the heat extraction by the refrigerant. The power consumption of the compressor was measured enabling the coefficient of performance (C.O.P.) to be determined.

The formulations given in the following Table gave the results shown, in ascending order of performance index:

| FORMULATION/% w/w | | | PERFORMANCE | | |
| --- | --- | --- | --- | --- | --- |
| % R125 | % R134A | % R600 | Duty/W | C.O.P | Index* |
| 60.0 | 37.5 | 2.5 | 1820 | 1.66 | 3021 |
| 40.0 | 56.5 | 3.5 | 1770 | 1.77 | 3133 |
| 50.0 | 47.5 | 2.5 | 1820 | 1.75 | 3185 |
| 60.0 | 36.5 | 3.5 | 1880 | 1.72 | 3234 |
| 40.0 | 57.5 | 2.5 | 1800 | 1.82 | 3276 |
| 50.0 | 46.5 | 3.5 | 1850 | 1.83 | 3386 |
| 46.5 | 50.0 | 3.5 | 1890 | 1.83 | 3459 |

*Performance Index = Duty × C.O.P., i.e measure of overall performance.

What is claimed is:

1. A lubricant-compatible refrigerant composition essentially non-flammable upon fractionation thereof, comprising (a) from about 40% to 55% by weight of pentafluoroethane, (b) from about 35% to 60% by weight of 1,1,1,2- and/or 1,1,2,2-tetrafluoroethane, and (c) from about 2.3% to 4% by weight of n-butane.

2. The lubricant-compatible, non-flammable refrigerant composition as defined by claim 1, comprising (c) about 3.5% by weight of n-butane.

3. The lubricant-compatible, non-flammable refrigerant composition as defined by claim 1, comprising (a) about 46% by weight of pentafluoroethane, (b) about 50 % by weight of tetrafluoroethane, and (c) about 4% by weight of n-butane.

4. The lubricant-compatible, non-flammable refrigerant composition as defined by claim 1, comprising (a) about 46.5% by weight of pentafluoroethane, (b) about 50% by weight of tetrafluoroethane, and (c) about 3.5% by weight of n-butane.

5. The lubricant-compatible, non-flammable refrigerant composition as defined by claim 1, comprising (a) from about 45% to 52% by weight of pentafluoroethane.

6. The lubricant-compatible, non-flammable refrigerant composition as defined by claim 1, comprising (b) from about 45% to 60% by weight of 1,1,1,2- and/or 1,1,2,2-tetrafluoroethane.

7. A lubricant-compatible, refrigerant composition essentially non-flammable upon fractionation thereof, consisting essentially of (a) from about 40% to 55% by weight of pentafluoroethane, (b) from about 35% to 60% by weight of 1,1,1,2- and/or 1,1,2,2-tetrafluoroethane, and (c) from about 2.3% to 4% by weight of n-butane.

8. A refrigeration process for cooling a given body, comprising condensing a lubricant-compatible refrigerant composition essentially non-flammable upon fractionation thereof and which comprises (a) from about 40% to 55% by weight of pentafluoroethane, (b) from about 35% to 60% by weight of 1,1,1,2- and/or 1,1,2,2-tetrafluoroethane, tetrafluoroethane, and (c) from about 2.3% to 4% by weight of n-butane, and thence evaporating said refrigerant composition in the vicinity of said body to be cooled.

9. In a refrigeration apparatus confining a refrigerant therefor, the improvement which comprises, as said refrigerant, a lubricant-compatible refrigerant composition essentially non-flammable upon fractionation thereof, and comprising (a) from about 40% to 55% by weight of pentafluoroethane, (b) from about 35% to 60% by weight of 1,1,1,2- and/or 1,1,2,2-tetrafluoroethane, and (c) from about 2.3% to 4% by weight of n-butane.

* * * * *